INVENTOR.
Donald L. Herr,
BY
ATTORNEY

Feb. 13, 1951 D. L. HERR 2,541,247

SWITCHING SYSTEM

Filed Nov. 26, 1947 5 Sheets-Sheet 2

INVENTOR.
Donald L. Herr,
BY
Edward L. Mueller
ATTORNEY

Feb. 13, 1951 D. L. HERR 2,541,247

SWITCHING SYSTEM

Filed Nov. 26, 1947 5 Sheets-Sheet 3

INVENTOR.
Donald L. Herr,
BY
Edward L. Mueller
ATTORNEY

INVENTOR.
Donald L. Herr,
BY
Edward L. [signature]
ATTORNEY

Feb. 13, 1951 D. L. HERR 2,541,247

SWITCHING SYSTEM

Filed Nov. 26, 1947 5 Sheets-Sheet 5

INVENTOR.
Donald L. Herr,
BY
Edward L. Mueller
ATTORNEY

Patented Feb. 13, 1951 2,541,247

UNITED STATES PATENT OFFICE 2,541,247

SWITCHING SYSTEM

Donald L. Herr, New York, N. Y., assignor to Control Instrument Company, Inc., Brooklyn, N. Y., a corporation of New York Application November 26, 1947, Serial No. 788,207

2 Claims. (Cl. 177—353)

This invention relates to switching systems and has particular reference to a system for controlling the selective interconnection between various instrumentalities.

In my copending application Serial No. 774,613, filed September 17, 1947, and now issued as Patent No. 2,453,911, dated November 16, 1948, I have shown a system wherein a multiplicity of instruments are adapted for selective interconnection by electro-mechanically operated means.

Herein, it is proposed to provide an improved switching system, wherein diversified interconnections between instrumentalities is accomplished by the arbitrary selection of any one of a plurality of control elements each having different media for identifying one of a plurality of combinations of possible interconnections, and thereby causing the selected element to electronically establish a desired interconnection.

The invention further provides an improved mechanism whereby the selection of any one of a plurality of control elements is effected in an accurate and rapid manner.

The inventive idea involved is capable of receiving a variety of expressions, some of which, for the purpose of illustration, are shown in the accompanying drawings; but it is to be expressly understood that said drawings are employed merely to facilitate the description of the invention as a whole and not to define the limits thereof, reference being had to the appended claims for that purpose.

The invention herein described is an adaptation of a switching system for the establishment of various combinations of generator-load interconnections, but it will be apparent as this description progresses that the invention, without departing from the spirit or scope thereof, is applicable to other switching systems, for example, wherein synchro transmitters and receivers may be coupled together or guns and directors of a gunnery fire control system may be selectively switched; and, in fact, to any system requiring the interconnection between various instrumentalities whatever their nature, by different selectable channels.

Figure 1:
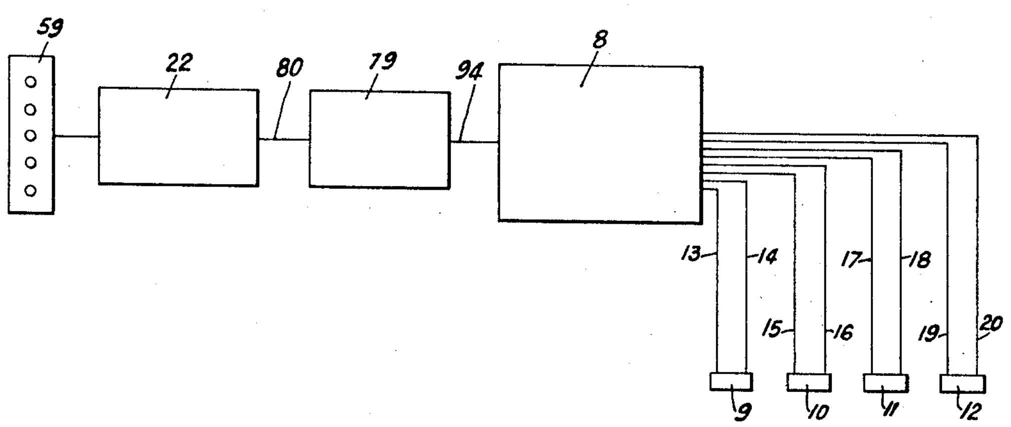
Fig. 1 is a schematic view illustrating a switching system embodying the features of the present invention.

Referring to Fig. 1 there is conventionally indicated a switchboard 8 wherein there is contained a plurality of switching devices capable of manual or electromagnetic operation and which operate through their various positions to establish or to disestablish the circuits to which they are related. Thus, for the embodiment shown, a number of instrumentalities, such as 9, 10, 11 and 12, which are connected to the switchboard by means of leads 13 to 20, may be interconnected in any form of connection, parallel or series, by the proper selection of switches. These instrumentalities may be generators and loads, for example, or synchros, or any conceivable instrument which it may be desirable to include or exclude from various circuits at different times.

In conformity with the present invention, such interconnections are established by the selection of one of a plurality of sets of control elements 21 (Fig. 4), contained in the selector unit 22, which elements each have different media thereon identifying a particular interconnection, and to therefore utilize the selected control element to activate switching mechanism which will effect the interconnection identified by the said control element.

Figure 2:
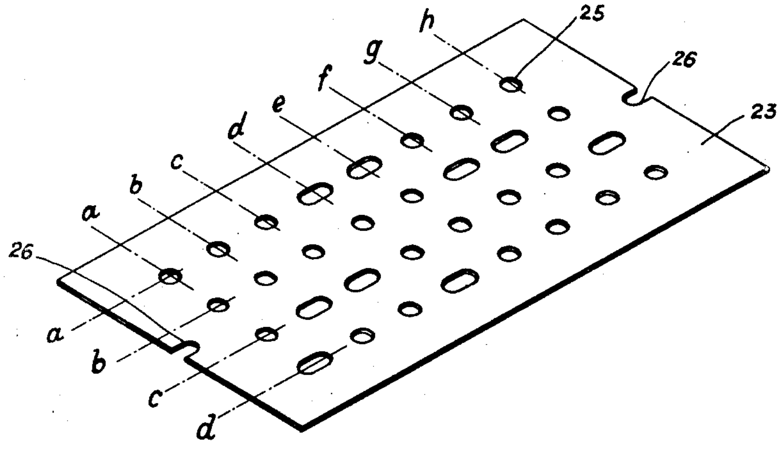
Fig. 2 is an isometric view of the control element.

The number of sets of control elements shown is wholly arbitrary and does not represent either an optimum or maximum number, but represents only an illustrative example which may be varied both in form and in number to suit particular applications. One such set is illustrated in Figs. 2 and 3 wherein it is shown to consist of two parts, a punched card 23 and a holder 24 therefor.

The card, shown in Fig. 2, bears the necessary indicia so that its selection serves in a manner hereinafter to be described, to actuate the associated apparatus and thereby to set up a predetermined combination of controlled elements. These identifying characteristics consist of punched holes and slots 25, arranged in a matrix of rows and columns which holes and slots serve, by their positions relative to each other, to make the desired selection. The various holes and slots have the same numerical designation, 25, and the rows and columns are designated by a letter. In this way, a particular hole or slot, with respect to its location in a row and column, may be designated by giving the characteristic number, together with the letters denoting the row and the column in which it may be found. Thus $25_{bc}$ would indicate an opening at the intersection of column *b*, row *c*, which is a hole, whereas $25_{bf}$ in the same way indicates a slot. The card shown has slots indicated at 25 (*ad, ae, bf, bg, cb, ca, ch, da* and *dd*) and the remainder of the openings therein are holes. The card is also furnished with two openings 26 at the ends thereof, which openings are for the purpose of receiving an aligning pin.

Figure 3:
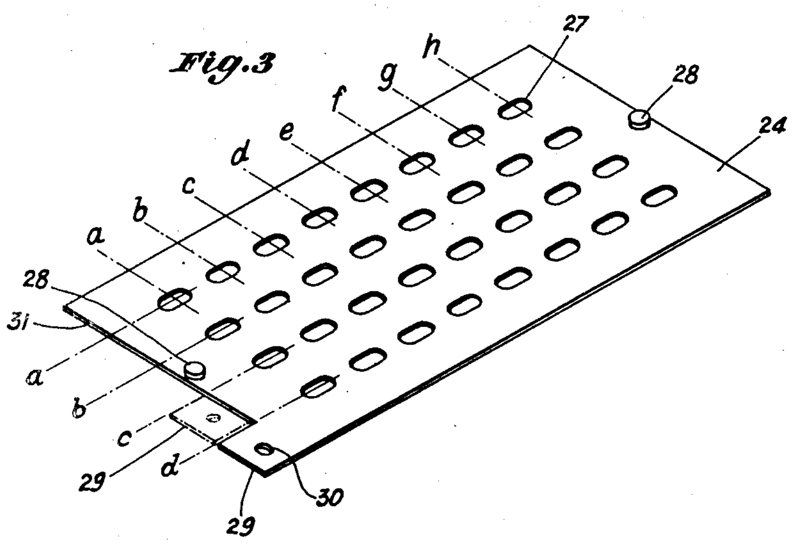
Fig. 3 is an isometric view of the control element holder.

The holder 24, illustrated in Fig. 3, is a plate having a matrix of openings 27, of a similar number of rows and columns to that of the card 23, which are similarly designated, and so spaced that they coincide precisely with the openings of the card. The openings 27 consist entirely of slots, so that they do not in any way obscure the openings in the card which they carry. At each end, the holder is furnished with a pin 28, which pins engage the openings 26 of the card, serving both to align the card upon the holder and to impart to the card any motion which may be imparted to the holder. The holder is also furnished with a tab or elongation 29 along one edge thereof, which tab serves to connect the holder by way of the opening 30 therethrough to the selector mechanism shown in Fig. 4. The location of the tab along the edge 31 of any particular holder is immaterial, but the arrangement of the group of holders should be such that the tab of one does not prevent access to the tab of another so that, as shown in Fig. 4, the holders have tabs so spaced along the edge 31 as to prevent their interference with each other.

Figure 4:
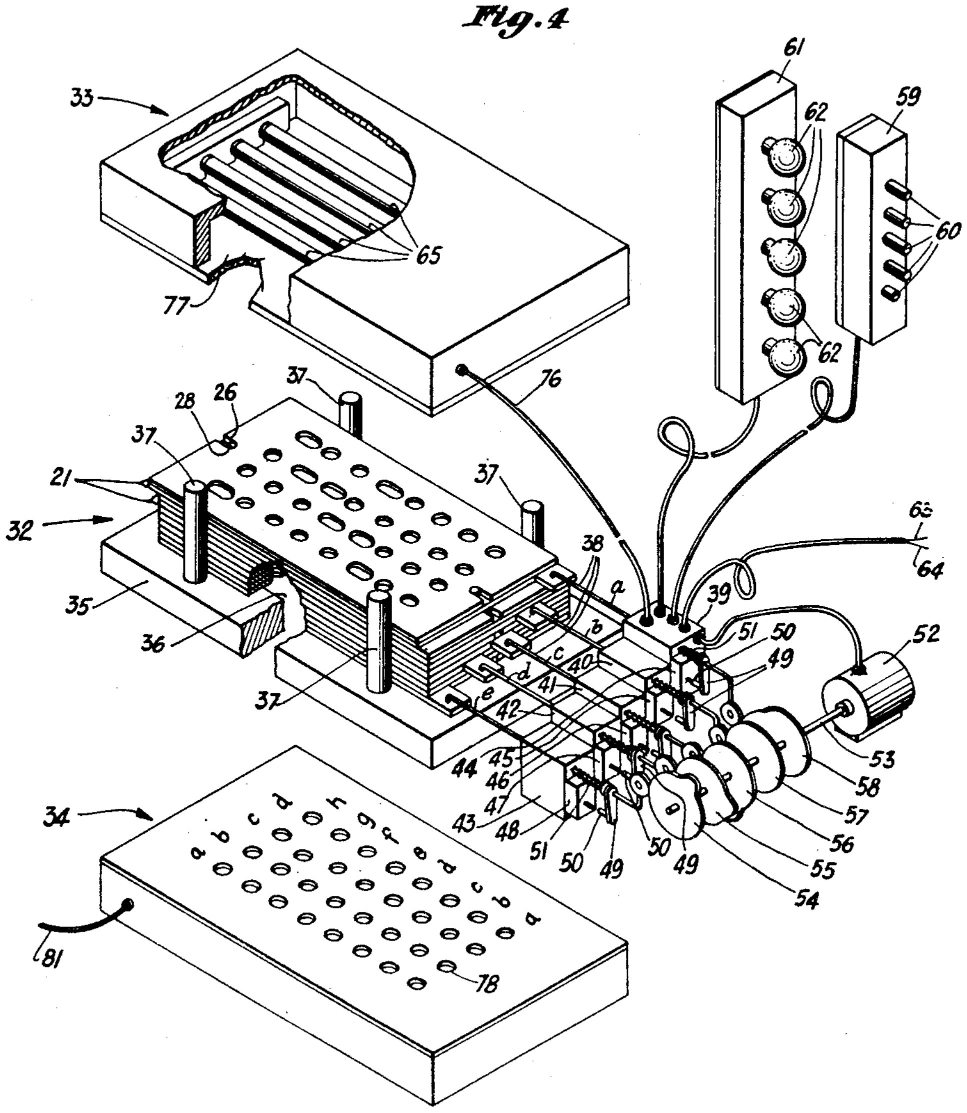
Fig. 4 is an exploded isometric view, partly in section, of the selector mechanism forming part of the invention.

The selector mechanism 22, shown in Fig. 4, comprises a device 32 for positioning the control elements 21, a light source 33 and a sensing element 34. The positioning device 32 comprises a platform 35 having an opening 36 therethrough which is greater in area than the area occupied by the matrix of openings on the card 23 or holder 24. The platform 35 is furnished with guide pins 37 which serve the dual purpose of supporting the light source 33 and aligning the control elements 21, five of which are shown in the embodiment illustrated, stacked one above the other.

Stacked and aligned vertically one above the other, each and every hole 25 and 27 of each control element 21 is aligned with those above and below, and offers free passage to light from the source 33 above through the stacked elements to the sensing element 34 below. The displacement of any one element will cause the holes to be out of alignment, thus obstructing the passage of light; but at those points where the displaced element has a slot rather than a hole, the light will not be cut off and will continue to impinge upon the sensing element below.

Each control element is connected, by means of the tab 29 on its holder 24 to a cam follower 38 which passes through the opening 30 on the tab 29, and may be reciprocated by the said cam follower 38 to cause the openings of a specific control element to block the access of light to specific points of the sensing element 34 or, conversely, to allow the access of light only to specific points of the sensing element 34, the results of which will hereinafter be more fully set forth.

The cam followers 38 are held by immovable guide blocks 39, 40, 41, 42 and 43 so that they are free only to assume reciprocatory motion, which blocks have mounted upon them a series of switches, 44, 45, 46, 47 and 48. The block 39 is also shown to contain the terminal board for the electrical interconnections necessary for the operation of the system.

Each follower 38 has mounted thereon a bracket 49 to which an auxiliary follower 50 is made fast, which bracket, and therefore its follower, is urged by the springs 51 in a direction opposite to that in which the followers are urged by the cams, by exerting pressure upon the blocks 39—43. The auxiliary followers 50 engage the transfer mechanism of the switches 44—48 and causes them to be operated when a particular follower 38 is displaced. A motor 52 which drives shaft 53 and positions cams 54—58 provides the motive power to displace the followers 38 against the tension of springs 51 and to actuate the switches 44—48.

Operation of the system is initiated from the selector switch 59 by actuating the appropriate switch 60 thereon, and the static conditions of the selector mechanism is indicated by the indicator 61 bearing signal lamps 62.

Figure 5:
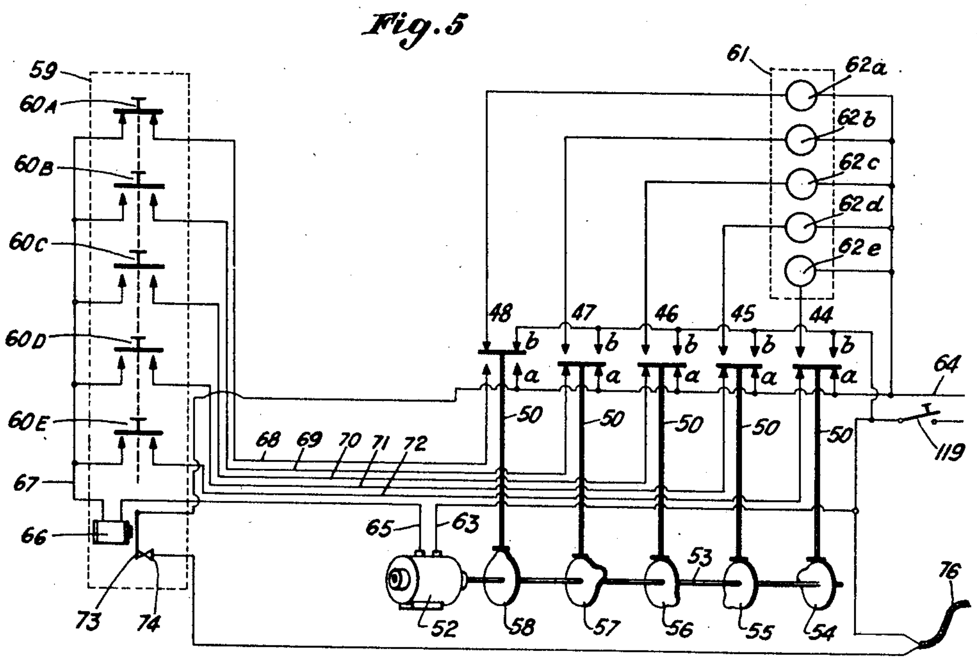
Fig. 5 is a diagrammatic view showing the electrical interconnections of said selector mechanism.

Fig. 5 may now be referred to to indicate the sequence of operation of the selector mechanism. The power source 63—64 may be alternating or direct current of any suitable voltage. A circuit is made whenever a switch 60 is actuated, from the side of the line designated 63, through the motor 52, the series coil of relay 66, the switch 60 actuated through the appropriate lead 68—72 and the appropriate switch 44—48 to the other side of the line 64, causing the motor 52 to run. In running, motor 52 turns the shaft 53 and with it the cams 54—58 and the motor 52 will continue to run until the follower 50 is actuated which breaks the motor circuit in switch 44—48, whereupon it stops. As illustrated, switch 60*a* is closed and the motor is idle because the "*a*" side of switch 48 is open, but if any other switch 60, such as 60*c* were closed, the latch bar interlock would release 60*a* and the circuit from conductor 67 through 60*c* would be completed over lead 70 and the "*a*" side of switch 46, and the motor would continue to run until cam 56 caused follower 50 to break the "*a*" side of switch 46. Since the followers 50 and 38 have the same motion, the spring 51 would cause 39*a* to return the displaced control element into alignment with the remaining elements and the control element operated by 38*c* would now be displaced.

The switches 44—48 have a set of "*b*" contacts, which contacts close when the "*a*" contacts are opened. These complete a circuit from the line 63, through the lamps 62 to the side 64 of the line. Since each lamp is individual to one of the control elements 21, the illuminated lamp indicates what element of the group is in operative position.

Since light falling on the sensory element 34 determines the switchboard behavior, it is necessary to provide some means of preventing any operation but that indicated by the desired control element. To this end, the contacts 73 and 74 are in series with the side 64 of the line which together with the side 63 provide energy for the lamps 65 in the illumination unit 33. These contacts are normally closed; however, when the motor is set in motion, its current in the coil of relay 66 causes the contacts 73 and 74 to open, deenergizing the cable 76 and therefore the lamps 65 for the interval during which change takes place.

The light unit 33 is furnished with a transparent base 77 and, though shown for convenience of illustration in Fig. 4 removed from the selector mechanism 32, is directly mounted on the posts 37 when in actual operation. When illuminated, light from the lamps 65 penetrates through those openings remaining after a control element 21 has been displaced so as to fall on the sensing unit 34. Said unit contains a matrix of photoelectric cells which are generally numbered 78 and are arranged in similar rows and columns to the rows and columns of the control elements. The unit is shown spaced apart from the selector mechanism 32 for convenience of illustration, but in practice is located directly beneath the selector mechanism adjacent to the platform 35.

Figure 6:
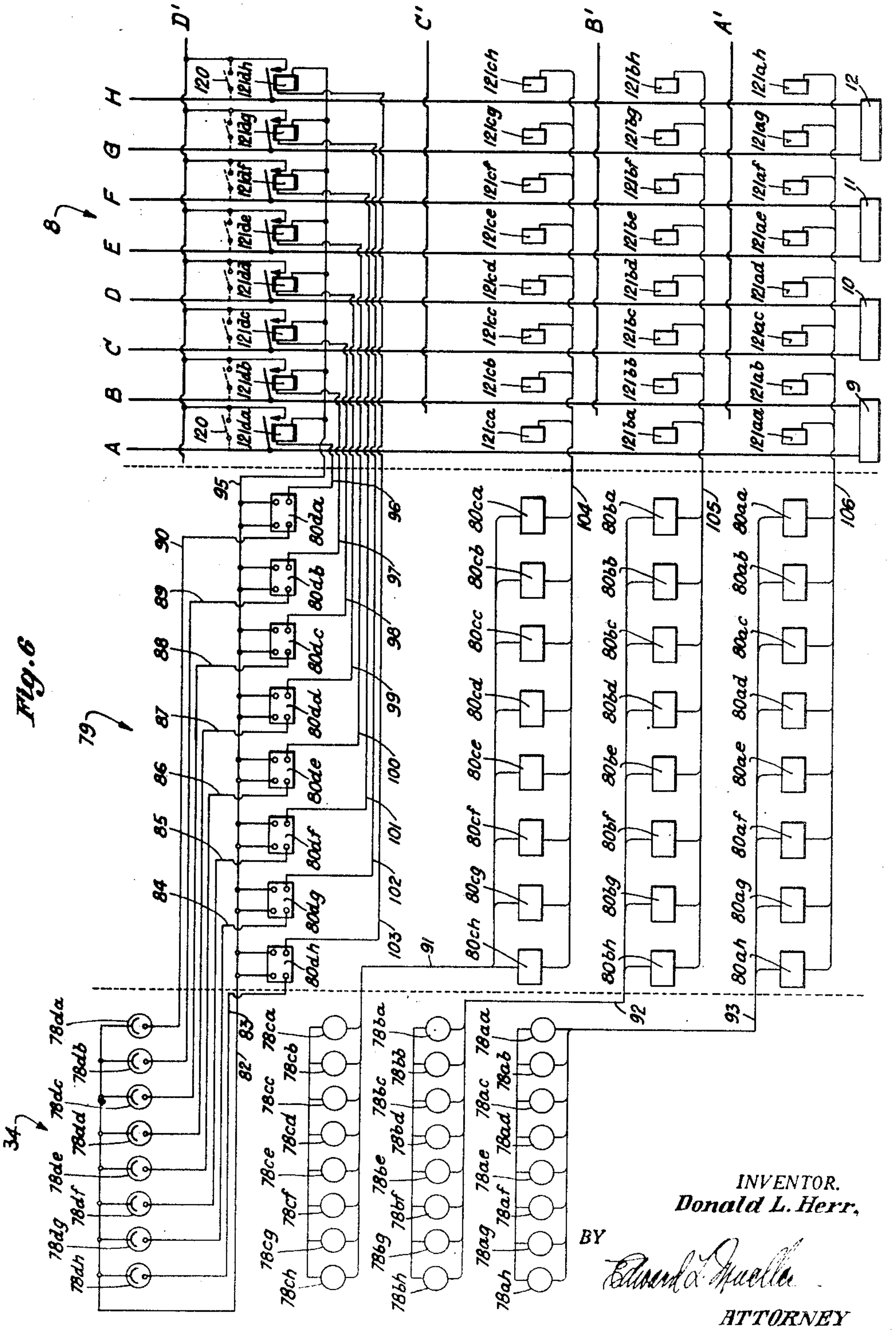
Fig. 6 is a schematic view showing the electrical interconnection of the entire switching system.

The card shown displaced in Fig. 4 has slots, as also shown in Fig. 2, which means that light can be transmitted through the stacked cards and will be incident only on cells 78 having similar subscripts, i. e., 78 (*ad, ae, bf, bg, cb, ca, ch, da and dd*). As shown in Fig. 6, the unit 34 is connected to an amplifier unit 79 containing a plurality of amplifiers, each individual to one of the photocells 78 and generally identified at 80, and by the same subscript notation for individual identification as the indices on the control elements and the photocell matrix. The cells 78 are connected to the amplifier 80 by a cable generally indicated as 81, which carries, for the embodiment illustrated, thirty-three separate leads. Nine are shown in detail, as 82—90, and the remaining leads are illustrated by 91, 92 and 93 each representing a group of eight leads.

By means well known to the art, the power output of the amplifiers 80 may be made to depend entirely upon the incidence of light on the photocells 78, the power output being negligible for the non-illuminated condition, and large enough to actuate a relay for the illuminated condition. This being so, incidence of light on cell $78_{dh}$ would, because of the connection 83 in cable 81 connecting it to amplifier $80_{dh}$, cause amplifier $80_{dh}$ to produce a large power output and, in a similar manner, each photocell illuminated would cause its associated amplifier to react.

The amplifiers in unit 79 are connected to the switchboard 8 by means of a cable generally indicated as 94, which cable is similar to cable 81 in that it carries, for this embodiment, thirty-three separate leads. Nine of said leads are shown individually as leads 95—103, the remainder being indicated by leads 104, 105 and 106, each representing a group of eight leads.

The switchboard 8 as shown in Fig. 6 comprises a series of twelve buses, A, B, D, C, E, F, G, H, A', B', C' and D' divided into two groups, I and II. Group I consisting of A to H and group II of A' to D', which buses are not interconnected in any way either within the groups or between the groups. By means of individual switches 120 each bus of group I may be connected to any or all of the buses of group II, thus requiring thirty-two switches in all. The switches are capable of being individually operated in any group or combination but should be coupled by a latch release to switch 119 (Fig. 5) so that switches 120 may be operated only when the line switch controlling the entire selector mechanism 119 is open and consequently said mechanism is disabled.

In parallel with each of said switches 120 are the contacts of a relay 121 which are normally open, but may be closed by energizing the relay coil thereby serving the same function on the switch 120. The cable 94 connects the amplifiers in unit 79 to the relays in switchboard 8, so that an increase in power output of any amplifier 80 will cause the associated relay 121 to close its contacts and complete a circuit between group I and group II of the buses.

It is now apparent that a group of slots 25 on a control element 21 will activate a related group of photoelectric cells 78 which in turn will cause a corresponding group of amplifiers 80 to activate a specific group of relays 121 and thus interconnect the buses of group I with those of group II.

The buses of group II are utilized merely as transfer elements and are not connected to any external circuits; however, those of group I are connected to external circuits which include the elements to be switched. Buses A and B are connected to leads 13 and 14 and thus to element 9; C and D to leads 15 and 16 and thus to element 10; E and F to leads 17 and 18 and thus to element 11; and G and H to leads 19 and 20 and thus to element 12.

Now using the same subscripts to designate the openings on the control cards, the photocells, the amplifiers and the relays, the effect of the displaced top control element is illustrated as in Fig. 4. Openings 25 (*ae, ad, bg, bf, ch, cc, cb, dd* and *da*) permit light to be incident upon cells 78 of the same subscript. This in turn activates relays 121 of the same subscript, resulting in circuits completed between the buses at A'E, A'D, B'G, B'F, C'H, C'C, C'B, D'D and D'A which puts the elements 11 and 12 which are in series, in parallel with elements 9 and 10. If element 10 were a generator, it would drive elements 11 and 12 in series, and element 9 independently in parallel.

By means of different openings 25 elongated, different combinations of elements 9, 10, 11 and 12 could be obtained and by increasing the size of the matrices any number of any combination of elements may be interconnected.

Figure 7:
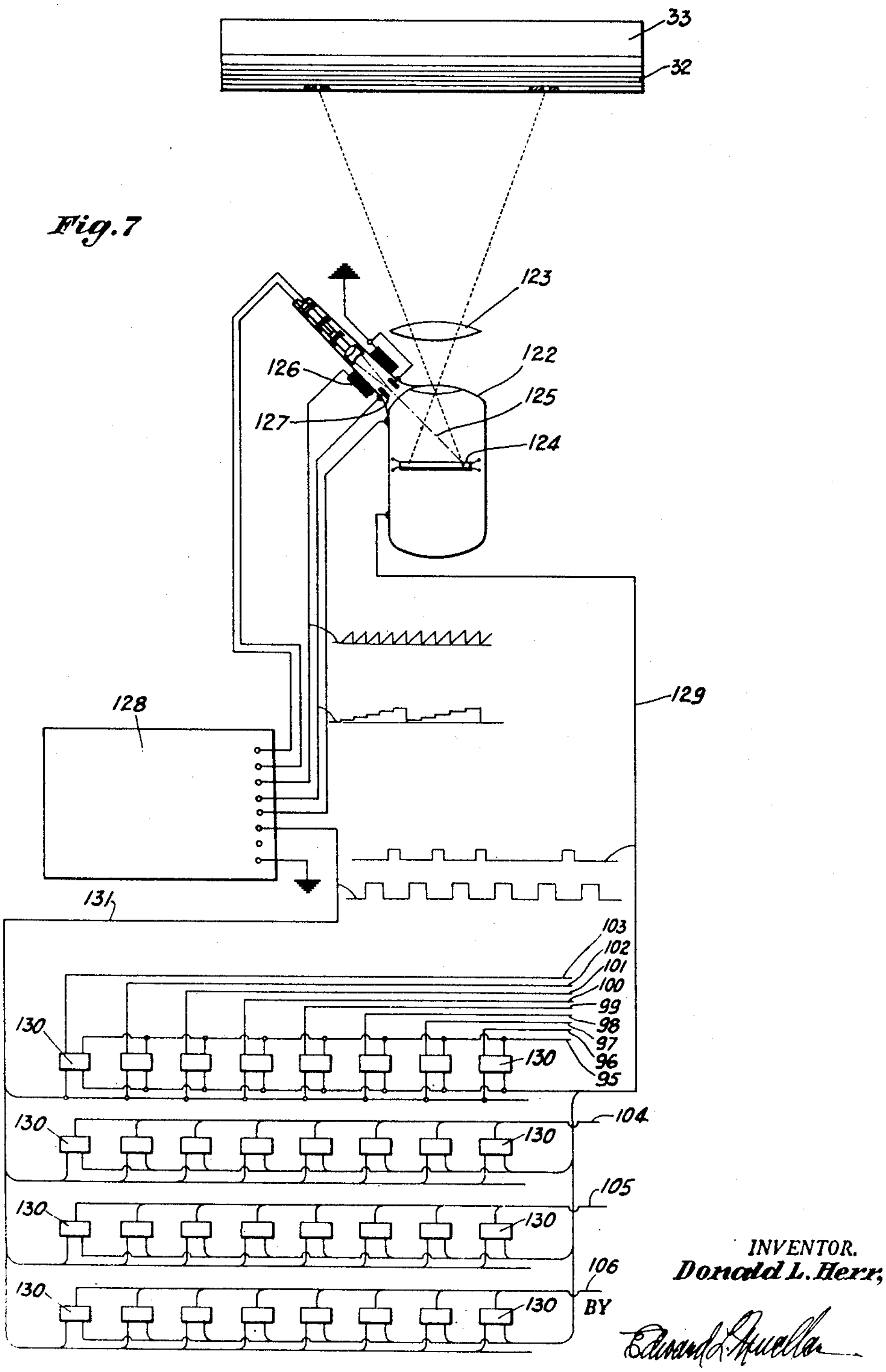
Fig. 7 is a schematic view showing alternative means for scanning the identifying media which operates the switching system.

Fig. 7 illustrates an alternative embodiment of the invention wherein the sensing unit 34 comprising a matrix of photocells is eliminated and an iconoscope 122 is substituted therefor. By means of a lens 123 an image of the light source 33 or as much thereof as is permitted to penetrate the control elements 21 in the selector unit 32 is made to fall upon the mosaic 124 of the iconoscope where it will appear as illuminated spots having positions which correspond to the elongated holes 25 of the displaced control element.

This image is scanned by the electron beam 125 of the iconoscope—that is to say, the beam is caused, by the combined action of the deflection coils 126 and deflection plates 127 as driven by the timing generator 128, to traverse the area of the mosaic in much the same manner as the human eye traverses a printed page. As the electron beam traverses an illuminated spot on the mosaic, the output current of the iconoscope on lead 129 will become large so that the existence of the lighted spot is sensed and may be utilized to operate the switchboard 8.

The output lead 129 of the iconoscope is common to all of the amplifiers 130, which differ from amplifiers 80 in that they each have a gate which is triggered by the timing generator 128 over lead 131, in a manner commonly employed in the electronic art; and will respond only in that interval during which the gate is open.

Since scanning and gating are accomplished by a common generator 128, the particular amplifier, which at any instant is open, is a function of the position of the scanning beam in the iconoscope, and thus, over leads 95—103, and leads 104—106, corresponding to the same numbered leads in Fig. 6, may control the relays 121 and thereby the elements 9, 10, 11 and 12 in the same manner as previously outlined by photoelectric cells.

What is claimed is:

1. In a switching system for interconnecting a plurality of instrumentalities in predetermined circuit combinations, a light source, a photoelectric sensing means upon which the light from said source impinges, a selector mechanism disposed between said light source and said sensing means for modifying the light impinging on the latter means, said selector mechanism including a plurality of stacked control elements each having an operative position to which it is moved and each further having vari-sized apertures therein completely identifying one of said circuit combinations, cam members coupled to said control elements for adjusting the same to operative position, means to operate said cam members to move one of said control elements to operative position to the exclusion of the others to thereby modify the transmission of light through said selector mechanism and its impingement upon said sensing means to activate the latter in accordance with the circuit combination identified solely by the operated control element, and means responsive to the activation of said sensing means for establishing the identified circuit combination.

2. In a switching system, the combination of selector means for initiating the interconnection of instrumentalities in one of a plurality of predetermined circuit combinations, a selector mechanism responsive to said means, a light source, and a light responsive electronic element operatively associated with said source; said selector mechanism including a series of motor driven cams controlled by said selector means and further including a plurality of independently operable and controlled elements coacting with said cams for movement to operative position thereby and each having means formed thereon for identifying any one of the various combinations of interconnections between said instrumentalities by modifying the light from said source passing through an operative controlled element and impinging upon said electronic element, means associated with said electronic element to enable the same to distinguish the light as modified, and means coacting with said electronic element to effect the interconnection between the instrumentalities identified by said operated controlled element.

DONALD L. HERR.

REFERENCES CITED

The following references are of record in the file of this patent:

UNITED STATES PATENTS

| Number | Name | Date |
|---|---|---|
| 1,320,807 | Tanner | Nov. 4, 1919 |
| 2,087,674 | Nelson | July 20, 1937 |
| 2,266,779 | Loughridge et al. | Dec. 23, 1941 |
| 2,294,457 | Holden | Sept. 1, 1942 |
| 2,382,055 | Homrighous | Aug. 14, 1945 |
| 2,438,825 | Roth | Mar. 30, 1948 |
| 2,453,911 | Herr | Nov. 16, 1948 |